United States Patent
Zhu et al.

(10) Patent No.: US 12,461,252 B2
(45) Date of Patent: Nov. 4, 2025

(54) ARAIM AVAILABILITY PREDICTION METHOD UNDER COMPLEX TERRAIN ENVIRONMENT

(71) Applicant: Beihang University, Beijing (CN)

(72) Inventors: Yanbo Zhu, Beijing (CN); Zhipeng Wang, Beijing (CN); Kun Fang, Beijing (CN); Jingtian Du, Beijing (CN); Hongxia Wang, Beijing (CN)

( * ) Notice: Subject to any disclaimer, the term of this patent is extended or adjusted under 35 U.S.C. 154(b) by 255 days.

(21) Appl. No.: 18/138,156

(22) Filed: Apr. 24, 2023

(65) Prior Publication Data

US 2024/0183998 A1    Jun. 6, 2024

(30) Foreign Application Priority Data

Dec. 5, 2022  (CN) .......................... 202211548576.2

(51) Int. Cl.
*G01S 19/40*    (2010.01)

(52) U.S. Cl.
CPC .................... *G01S 19/40* (2013.01)

(58) Field of Classification Search
CPC ................. G01S 19/40; G01S 19/20
See application file for complete search history.

(56) References Cited

U.S. PATENT DOCUMENTS

| | | | | |
|---|---|---|---|---|
| 5,663,732 A | * | 9/1997 | Stangeland | G01S 19/41 340/979 |
| 5,760,737 A | * | 6/1998 | Brenner | G01S 19/20 342/464 |
| 5,969,672 A | * | 10/1999 | Brenner | G01C 21/165 342/357.29 |
| 10,197,678 B1 | * | 2/2019 | Wang | G01S 19/20 |
| 2021/0064847 A1 | * | 3/2021 | Cypriano | G06F 17/18 |

FOREIGN PATENT DOCUMENTS

CN         104536015 B  *  4/2017  ............. G01S 19/23

\* cited by examiner

*Primary Examiner* — Mary Cheung

(57) ABSTRACT

An ARAIM availability prediction method under a complex terrain environment is provided. The method includes: 1) selecting positioning points according to an air line; 2) calculating terrain shielding angles; 3) predicting visible satellites; 4) determining a fault mode that needs to be monitored; 5) calculating a positioning error variance, an influence coefficient of a nominal deviation, and a variance of a solution separation test statistic; and 6) calculating a threshold of a solution separation test, calculating a protection level, and determining availability. According to the method, the terrain shielding angles are calculated based on terrain model data, and the visible satellites are predicted based on ephemeris data or almanac data to further calculate a protection level, while determining the availability; and the accuracy of availability prediction can, by considering the effect of terrain barriers on the prediction of the visible satellites, be improved to ensure the safety of aircrafts.

10 Claims, 2 Drawing Sheets

ARAIM AVAILABILITY PREDICTION METHOD UNDER COMPLEX TERRAIN ENVIRONMENT

CROSS REFERENCE TO THE RELATED APPLICATIONS

This application is based upon and claims priority to Chinese Patent Application No. 202211548576.2, filed on Dec. 5, 2022, the entire contents of which are incorporated herein by reference.

TECHNICAL FIELD

The present disclosure relates to the technical field of satellite navigation, in particular to an ARAIM availability prediction method under a complex terrain environment.

BACKGROUND

As a high-end group customer of Global Navigation Satellite System (GNSS), not only does civil aviation need extremely high accuracy, but also it puts forward almost demanding requirements for integrity. Integrity indicates an ability for the navigation system to give a timely alert when positioning information provided thereby cannot satisfy the performance requirements as required by corresponding operations during the corresponding operations by aviation users using the navigation system.

Advanced Receiver Autonomous Integrity Monitor (ARAIM), as an airborne-based augmentation technique directed towards Dual Frequency Multi-Constellation (DFMC) satellite navigation system, is used for ensuring the integrity of navigation in air lines, terminal areas, approaches, and other complete operation stages. The complete ARAIM system consists of three parts: a navigation constellation, an airborne receiver, and a ground monitoring station that generates integrity support messages (ISM). The ARAIM airborne receiver supports the fast detection and exclusion of satellite and constellation faults with the redundant satellite observations and ISM, followed by giving an alert to the users in a timely manner.

System availability refers to the percentage of available time for the system to provide navigation services to carriers to time in the navigation stage. Before takeoff, it is required to predict the system availability to avoid any safety accident. To better satisfy the requirements of application in life safety on the satellite navigation system, it is of great importance to improve the prediction accuracy of the system availability. A complete flight process of civil aircrafts approximately includes five main stages. As different physical properties and attributes of airspace where the aircrafts are located are different in each stage, the performance requirements of support techniques, such as a navigation technique and a communication technique, are also different in order to ensure flight safety. As for a certain operation stage of the aircrafts, the ARAIM availability may be determined through positioning errors based on an upper limit of a certain confidence coefficient, that is, a protection level (PL). If the protection level of the ARAIM airborne receiver in a certain epoch is lower than an alert limit (AL) as required by operation, ARAIM in this epoch is available, or else, it is unavailable. Therefore, the essential element to predict the ARAIM availability is the prediction of the protection level.

The protection level of ARAIM depends on the positions and performance of the satellites participating in positioning. The actual positions of the navigation satellites may be calculated according to ephemeris or almanacs broadcast by the satellites; and the performance of the satellites changes slowly over time, and a parameter representing the performance of the satellites is from the commitment of constellation service providers (CSP) to the performance or an integrity support parameter broadcast historically. In predicting the ARAIM availability, it is necessary to predict the visible satellites of the receiver, followed by calculating the protection level through the performance of the visible satellites. Therefore, the prediction accuracy of the visible satellites directly decides whether the prediction of the ARAIM availability is correct. However, looseness was inherent in determining whether the receiver may receive satellite signals according to the position of the receiver and the ephemeris or almanacs of the satellites alone, since the satellite signals may be blocked by huge obstacles, e.g., mountains. None of the prediction methods of the existing ARAIM availability considers the influence arising from terrain barriers. Actually, if flight air lines are close to the mountains, or approaches are located in airports between valleys (Nyingchi Airport and Lhasa Airport in China), the navigation satellites are extremely prone to blocking during the flight of the aircrafts. By statistics, after considering the influence caused by terrain barriers, the duration of the visible satellites in part of regions will be shortened by 5%, and available vacant time even may be by improved to 4 times.

SUMMARY

The objective of the present disclosure is to provide an ARAIM availability prediction method under a complex terrain environment. According to terrain model (e.g., digital elevation model (DEM)) data, terrain shielding angles are calculated, and visible satellites are predicted based on ephemeris data or almanac data to further calculate a protection level, while determining the availability; and the accuracy of availability prediction may, by considering the effect of terrain barriers on the prediction of the visible satellites, be improved to ensure the safety of aircrafts during flight.

To fulfill the above objective, the present disclosure provides an ARAIM availability prediction method under the complex terrain environment, including:
1) selecting a positioning point according to an air line of an aircraft under operation;
2) calculating terrain shielding angles;
3) predicting visible satellites;
4) determining a fault mode that needs to be monitored;
5) calculating a positioning error variance, an influence coefficient of a nominal deviation, and a variance of a solution separation test statistic; and
6) calculating a threshold of a solution separation test, calculating a protection level, and determining availability.

Preferably, a calculation method of the terrain shielding angles is as follows, based on all directions of terrain model data: determining a step size in search of directional angles, and calculating the terrain shielding angle of each directional angle with the terrain model data.

Preferably, a selection range of terrain model data, in the calculation method of the terrain shielding angles, is set in such a way that the terrain model data of a circle centered on a user positioning point A or a square area is selected, with a diameter or a side length over a search range not less than 50 km.

Preferably, the step size in search of the directional angles, in the calculation method of the terrain shielding angles, is set in such a way that the directional angles in search are distributed uniformly, and the step size in search is not larger than pi/180.

Preferably, a search method of a maximum elevation positioning point based on the terrain model data includes the following steps of for the azimuth angle as theta, searching a pixel block of the directional angle between a center point and the user positioning point A within $[\theta_{AB}-\beta/2, \theta_{AB}+\beta/2]$ based on the step size (beta) in search of the directional angle, calculating an elevation between a center point of the pixel block and the user positioning point, and searching the maximum elevation; and selecting the terrain shielding angle corresponding to the azimuth angle theta that is equivalent to the maximum elevation.

Preferably, a calculation method of the elevation based on the terrain model data is as follows: the user positioning point A and a user positioning point B are set as sampling center points of the terrain model data, and the elevation between any one point in a sampling pixel block of the terrain model data, centered on the point B, and the point A is calculated in the following formula:

$$\alpha_{AB} = \max\left(\arcsin\left(\frac{\vec{n}_A \cdot \vec{AB}}{\|\vec{AB}\|}\right), 0\right).$$

Preferably, a prediction method of the visible satellites considering terrain influence is as follows: calculating satellite positions according to the ephemeris or the almanacs of the satellites, and filtering out the satellites with the elevations being less than the terrain shielding angle and a receiver shielding angle, and obtaining a predicted visible satellite set;

a screening rule is as follows: the directional angle of the satellite C, observed by a user receiver, is denoted as $\theta_{AC}$, the elevation is denoted as $\alpha_{AC}$, the terrain shielding angle corresponding to the directional angle is denoted as $\alpha_{AB}$, and the receiver shielding angle corresponding to the directional angle is denoted as $\alpha_{rc}$; and if the satellite C satisfies $$\theta_{AC} \in \left[\theta_{AB} - \frac{\beta}{2}, \theta_{AB} + \frac{\beta}{2}\right), \alpha_{AC} > \max(\alpha_{AB}, \alpha_{rc})$$

it is viewed as a visible satellite, or else, the satellite C is invisible.

Preferably, a selection method of monitored fault modes for ARAIM considering the terrain influence is as follows: calculating the terrain shielding angles corresponding to the all-directional angles with the terrain model data, predicting to obtain the visible satellite set, calculating fault probabilities in different fault modes according to the primary service fault probability of the single satellite and the primary service fault probabilities of two and more than two satellites in ISM, and selecting the larger fault mode therefrom as the monitored fault mode in a principle that the total probability of fault modes to be monitored should not exceed a preset value.

Preferably, an ARAIM continuity risk method considering the terrain influence is as follows: calculating the terrain shielding angles corresponding to the all-directional angles with the terrain model data, predicting to obtain the visible satellite set, and equally distributing the continuity risk budget to each selected monitored fault mode.

Preferably, a protection level prediction method considering the terrain influence is as follows: calculating the terrain shielding angles corresponding to the all-directional angles with the terrain model data, predicting to obtain the visible satellite set, and performing calculation with the visible satellite performance parameter to obtain the protection level.

Therefore, the present disclosure provides an ARAIM availability prediction method under the complex terrain environment, which has the following technical effects:

(1) the present disclosure provides a digital elevation model-based calculation method of the terrain shielding angles, by which the calculation accuracy of the terrain shielding angles is improved;

(2) the present disclosure provides a visible satellite prediction method considering the terrain influence, by which the prediction accuracy of the visible satellites is improved;

(3) the present disclosure provides a new calculation method for the protection level of ARAIM;

(4) the present disclosure provides a robust prediction method for the ARAIM availability; and (5) the present disclosure facilitates improvement in the safety of ARAIM, and promotes the upgrading in the performance of ARAIM.

The technical solutions of the present disclosure will be further described below in detail with reference to drawings and examples.

DETAILED DESCRIPTION OF THE EMBODIMENTS

To make the objectives, technical solutions, and advantages of the present disclosure clearer, more thorough, and complete, the following clearly and completely describes the technical solutions of the present disclosure with reference to drawings and examples.

Figure 1:
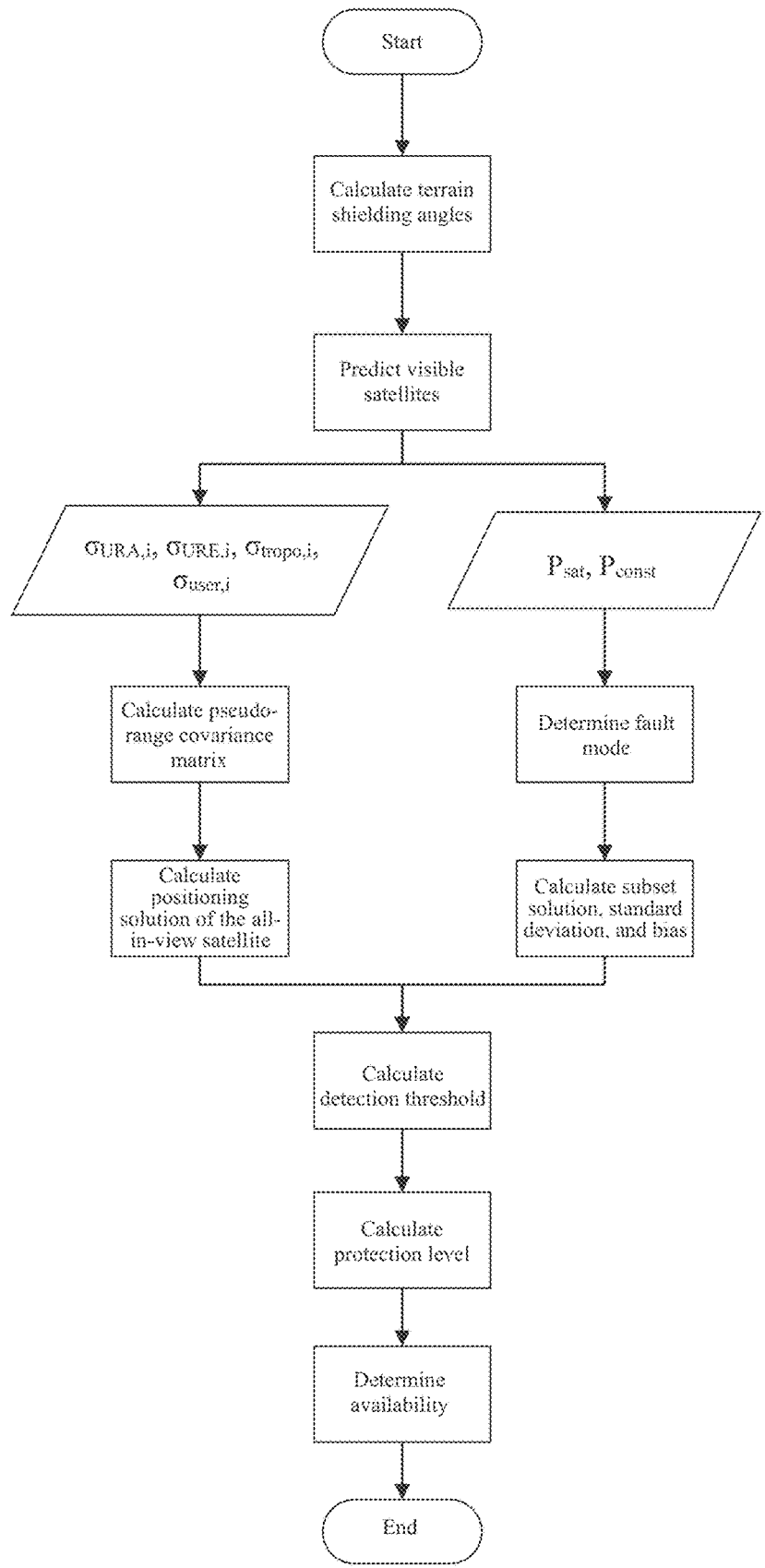
FIG. 1 is a data processing flow diagram.

Example 1 Terrain shielding angles corresponding to all-directional angles at which a user receiver is located at a point A is calculated An aircraft operation air line with availability to be predicted is selected, and then, a plurality of positioning points are selected along the air line. The prediction of the availability is performed for each positioning point, and the specific processing flow of data is shown in FIG. 1.

Figure 2A:
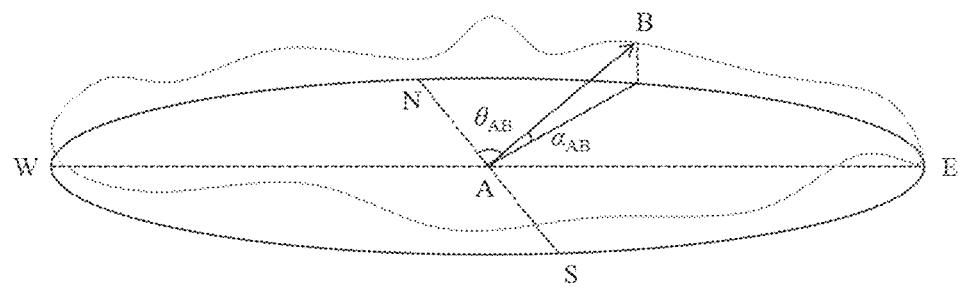
FIGS. 2A and 2B show schematic diagrams of terrain shielding angles.
Figure 2B:
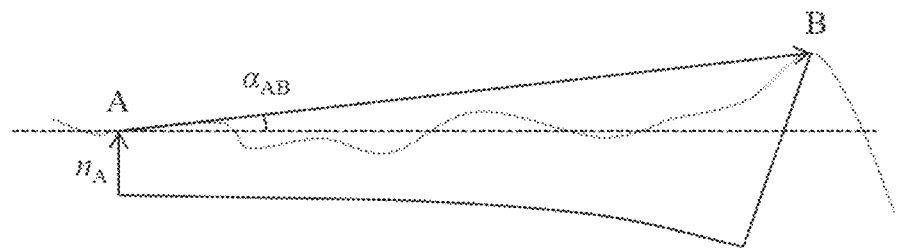

At a positioning point A, terrain shielding angles corresponding to all-directional angles at which a user receiver is located at the point A is calculated. FIGS. 2A and 2B show schematic diagrams of the terrain shielding angle, in which a gray curve is a terrain contour line, and a point B is a positioning point where the user receiver located at the point A has the maximum elevation in the $\text{theta}_{AB}$ direction. At this moment, the elevation $\text{alpha}_{AB}$ is the terrain shielding angle of the user receiver located at the point A in the $\text{theta}_{AB}$ direction. Considering the earth surface having a radian, the search range of the point B needs not to be excessive based on the point A.

Terrain model data, such as digital elevation model data, in a circle centered on the point A and having a radius of L (diameter not less than 50 km) or a square area is selected. At a step size in search (not more than pi/180) as beta, the terrain shielding angle of the point A in all directions is calculated.

Figure 3:
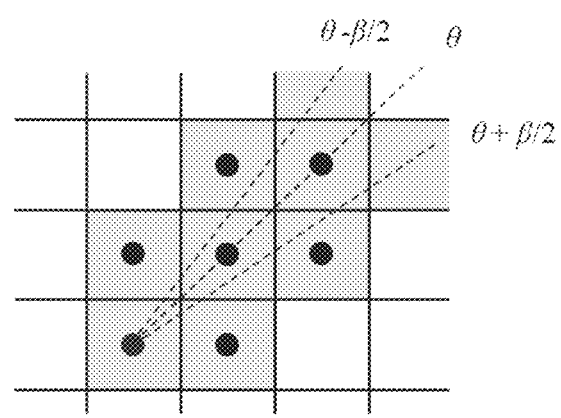
FIG. 3 is a schematic diagram of maximum elevation in search.

As shown in FIG. 3, in terms of an azimuth angle theta, a pixel block of the directional angle between a sampling center point of the terrain model data and the point A within $[\theta_{AB}-\beta/2, \theta_{AB}+\beta/2]$ is searched, an elevation is calculated, and the terrain shielding angle corresponding to the azimuth angle theta that is equivalent to the maximum elevation is selected. As shown in FIG. 2B, a calculation formula for the elevation is as follows:

$$\alpha_{AB} = \max\left(\arcsin\left(\frac{\vec{n}_A \cdot \vec{AB}}{\|\vec{AB}\|}\right), 0\right) \quad (1)$$

Example 2 At time t, a visible satellite set S at which a user receiver is located at a positioning point A is predicted According to ephemeris or almanacs broadcast by satellites, the positions of the satellites at time t are acquired. the azimuth angle of the satellite C, observed by the user receiver, is denoted as $\theta_{AC}$, the elevation is denoted as $\alpha_{AC}$, the terrain shielding angle corresponding to the directional angle is denoted as $\alpha_{AB}$, and a receiver shielding angle corresponding to the directional angle is denoted as $\alpha_{rc}$.

If the satellite C satisfies $$\theta_{AC} \in \left[\theta_{AB} - \frac{\beta}{2}, \theta_{AB} + \frac{\beta}{2}\right], \alpha_{AC} > \max(\alpha_{AB}, \alpha_{rc}) \quad (2)$$

it is viewed as a visible satellite, or else, the satellite C is invisible. As shown in FIG. 2A, S indicates a position at time t, and the visible satellite set at which the user receiver is located at the positioning point A is predicted.

Example 3 According to an ISM parameter, a set F of fault modes to be monitored is determined according to the primary service fault probability $P_{sat}$ of a single satellite and the primary service fault probabilities $P_{const}$ of two and more than two satellites, fault probabilities in different fault modes are calculated. The total number of the satellites is set as $N_{sat}$, and the total number of constellations is $N_{const}$. For a fault mode in which i fault satellites and j fault constellations are involved, the fault probability is as follows:

$$P_{i,j} = P_{sat}^i (1-P_{sat})^{N_{sat}-i} P_{const}^j (1-P_{const})^{N_{const}-j} \quad (3)$$

The total probability of all fault probabilities is 1. The fault modes are ordered by the fault probabilities in either ascending or descending size, the fault mode with the larger probability is removed from the fault mode set (it means that the fault mode needs to be monitored) until the total probability of the fault modes to be monitored does not exceed a certain preset value.

Example 4A positioning error parameter of each fault mode is calculated

For each fault mode k, the fault satellites are removed from the visible satellite set S in Example 2, and a positioning error variance, an influence coefficient of a nominal deviation, and a variance of a solution separation (SS) test statistic are calculated when positioning is carried out with a set $\overline{S}_k$ of the remaining visible satellites.

Pseudo-range error-based diagonal covariance matrices $C_{int}$ (integrity) and $C_{acc}$ (accuracy and continuity) are as follows:

$$C_{int}(i,i) = \sigma_{URA,i}^2 + \sigma_{tropo,i}^2 + \sigma_{user,i}^2 \quad (4)$$

$$C_{acc}(i,i) = \sigma_{URE,i}^2 + \sigma_{tropo,i}^2 + \sigma_{user,i}^2 \quad (5)$$

Where values of user range accuracy $\sigma_{URA,i}$ for integrity evaluation and a user range error $\sigma_{URE,i}$ for accuracy and continuity evaluation are derived from ISM; a tropospheric delay standard deviation $\sigma_{tropo,i}$ is used for a model in a standard file Minimum Operational Performance Standards for 1090 MHz Automatic Dependent Surveillance-broadcast (ADS-B): DO-242A; and a user side error source standard deviation $\sigma_{user,i}$ is used for an airborne accuracy indicator model A (AAD-A), which is an error envelope undergoing carrier smoothing as used herein.

When the receiver is used for the resolution of positioning, the update of a weighted least squares positioning solution is $$\Delta x = (G^T W G)^{-1} G^T W \Delta PR \quad (6)$$

Where a geometry matrix G is an $N_{sat} \times (3+N_{const})$ matrix, $N_{const}$ is the number of constellations; $G^T$ indicates a transposed matrix of the geometry matrix G; and $(G^T W G)^{-1}$ indicates an inverse matrix of a matrix $G^T W G$. The first three rows of G are determined in the same manner as they do in the traditional positioning method, and the remaining rows are determined according to the following rules:

$$G_{i,3+j}=1, \text{ a satellite } i \text{ belongs to a constellation } j \quad (7)$$

$$G_{i,3+j}=0, \text{ other cases} \quad (8)$$

A weighting matrix W is $$W = C_{int}^{-1} \quad (9)$$

$\Delta PR$ is a difference between a pseudo-range measured value obtained based on a satellite position and a positioning solution in the last iteration and an expected value. In case of the convergence of the positioning solution, the final $\Delta PR$ is denoted as y.

For each fault mode k in the fault mode set F, $idx_k$ is denoted as a subscript of the satellites in the set $\hat{S}_k$ of the remaining visible satellites, a weighting matrix $W^{(k)}$ of the set $\overline{S}_k$ of the remaining visible satellites is $$W^{(k)}(i,i) = C_{int}^{-1}(i,i) \text{ in case of } i \in idx_k \quad (10)$$

$$W^{(k)}(i,i) = 0 \text{ for others} \quad (11)$$

Let the subscript q=1, 2, and 3 indicate three directions: East (E), North (N), and Up (U). A subset positioning solution $\hat{x}^{(k)}$ derived from the set $\overline{S}_k$ of the remaining visible satellites is used, and a variance of a positioning error thereof in the q direction is $$\sigma_q^{(k)2} = (G^T W^{(k)} G)_{q,q}^{-1} \quad (12)$$

An influence coefficient of the nominal deviation $b_{nom,i}$ in ISM in the q direction in terms of the subset positioning solution $\hat{x}^{(k)}$ is $$b_q^{(k)} = \sum_{i=1}^{N_{sat}} |S_{q,i}^{(k)}| b_{nom,i} \qquad (13)$$

The solution separation test statistic is defined as a difference between an all-in-view satellite set positioning solution $\hat{x}^{(0)}$ derived from the visible satellite set S and a subset positioning set $\hat{x}^{(k)}$ derived from the set $\overline{S}_k$ of the remaining visible satellites, that is $$\Delta \hat{x}^{(k)} = |\hat{x}^{(k)} - \hat{x}^{(0)}| = |(S^{(k)} - S^{(0)})y|$$

$$S^{(k)} = (G^T W^{(k)} G)^{-1} G^T W^{(k)} \qquad (14)$$

A calculation method of a variance $$\sigma_{ss,q}^{(k)2}$$

of the solution separation test statistic $\Delta \hat{x}^{(k)}$ in the q direction is as follows:

$$\sigma_{ss,q}^{(k)2} = e_q^T (S^{(k)} - S^{(0)}) C_{acc} (S^{(k)} - S^{(0)})^T e_q \qquad (15)$$

Where $e_q$ indicates a vector in which the qth element is 1, while other elements are 0.

Example 5 For each fault mode k, a solution separation test threshold is determined For each fault mode k, a threshold $T_{k,q}$ of a solution separation test statistic is $$T_{k,q} = K_{fa,q} \sigma_{ss,q}^{(k)2} \qquad (16)$$

Where $K_{fa,q}$ is an inverse function (quantile) of a probabilistic cumulative distribution function, with a specific value depending on a continuity risk distributed to each fault mode k:

$$K_{fa,q} = Q^{-1}\left(1 - \frac{P_{fa,q}^{(k)}}{2}\right) \qquad (17)$$

Where $P_{fa,q}^{(k)}$ is a continuity budget distributed to each fault mode k, and $Q^{-1}(p)$ is a (1-p) quantile of standard Gaussian distribution.

Example 6 The availability of ARAIM at time t, and a positioning point A is determined For each fault mode k, a protection level is:

$$PL_k = K_{PHMI,q} \sigma_q^{(k)2} + K_{fa,q} \sigma_{ss,q}^{(k)2} + b_q^{(k)} \qquad (18)$$

Where, $$K_{PHMI,q} = Q^{-1}\left(1 - \frac{P_{PHMI,q}^{(k)}}{2P_k}\right) \qquad (19)$$

$P_{PHMI,q}^{(k)}$ is an integrity budget distributed to each fault mode k, and $P_k$ is a fault probability of each fault mode k.

The predicted protection level is $$PL = \max(PL_k) \qquad (20)$$

$P_{PHMI,q}^{(k)}$ is adjusted to make $PL_k$ equal, so that PL reaches the theoretical minimum value.

If the predicted protection level is lower than an alert limit of performance requirements, that is, $$PL < AL \qquad (21)$$

it indicates ARAIM is available, or else, it is unavailable.

Therefore, the present disclosure provides an ARAIM availability prediction method under a complex terrain environment. According to the method, the terrain shielding angles may be calculated according to terrain model data; visible satellites are predicted according to ephemeris or almanac data to further calculate the protection level, while judging the availability; and the accuracy of availability prediction can, by considering the effect of terrain barriers on the prediction of the visible satellites, be improved to ensure the safety of aircrafts during flight.

Finally, it should be noted that the above examples serve only to illustrate the technical solutions of the present disclosure and not to limit the same; although the present disclosure has been described in detail with reference to the preferred examples, it should be understood by a person of ordinary skill in the art that the technical solutions of the present disclosure can still be amended or equivalently replaced; and these amendments or equivalent replacements should not make the amended technical solutions deviate from the spirit and scope of the technical solutions of the present disclosure.

What is claimed is:

1. An advanced receiver autonomous integrity monitor (ARAIM) availability prediction method under a complex terrain environment performed by a processor, comprising the steps of:
   1) selecting a positioning point according to an air line of an aircraft under operation;
   2) calculating terrain shielding angles;
   3) predicting visible satellites;
   4) determining a fault mode, wherein the fault mode needs to be monitored;
   5) calculating a positioning error variance, an influence coefficient of a nominal deviation, and a variance of a solution separation test statistic;
   6) calculating a threshold of a solution separation test, calculating a protection level, and determining an availability; and
   7) sending safety warnings to the aircraft based on the determined availability.

2. The ARAIM availability prediction method according to claim 1, wherein the terrain shielding angles are based on all directions of terrain model data, with a calculation method of the terrain shielding angles comprising: determining a step size in search of directional angles, and calculating the terrain shielding angle of each of the directional angles with the terrain model data.

3. The ARAIM availability prediction method according to claim 2, wherein a selection range of the terrain model data is set in a way that the terrain model data of a circle centered on a user positioning point A or a square area is selected, with a diameter or a side length greater than or equal to 50 km over a search range.

4. The ARAIM availability prediction method according to claim 3, wherein a search method of a maximum elevation positioning point based on the terrain model data comprises the following steps of
   setting an azimuth angle as theta, searching a pixel block of the directional angle between a center point and the user positioning point A within $[\theta_{AB}-\beta/2, \theta_{AB}+\beta/2]$ based on the step size (beta) in search of the directional angle, calculating an elevation between a center point of the pixel block and the user positioning point, and searching a maximum elevation; and selecting the terrain shielding angle corresponding to the azimuth angle theta, wherein the azimuth angle theta is equivalent to the maximum elevation.

5. The ARAIM availability prediction method according to claim 4, wherein a calculation method of the elevation based on the terrain model data is as follows:

the user positioning point A and a user positioning point B are set as sampling center points of the terrain model data, and the elevation between any one point in a sampling pixel block of the terrain model data, centered on the user positioning point B, and the user positioning point A is calculated in the following formula:

$$\alpha_{AB} = \max\left(\arcsin\left(\frac{\vec{n}_A \cdot \vec{AB}}{\|\vec{AB}\|}\right), 0\right).$$

6. The ARAIM availability prediction method according to claim 2, wherein the step size in search of the directional angles, in the calculation method of the terrain shielding angles, is set in a way that the directional angles in search are distributed uniformly, and the step size in search is less than or equal to pi/180.

7. The ARAIM availability prediction method according to claim 1, wherein a prediction method of the visible satellites considering a terrain influence is as follows:

calculating satellite positions according to an ephemeris or almanacs of the satellites, and filtering out satellites with the elevations being less than the terrain shielding angle and a receiver shielding angle, and obtaining a predicted visible satellite set;

a screening rule is as follows: a directional angle of a satellite C, observed by a user receiver, is denoted as $\theta_{AC}$, the elevation is denoted as $\alpha_{AC}$, the terrain shielding angle corresponding to the directional angle is denoted as $\alpha_{AB}$, and the receiver shielding angle corresponding to the directional angle is denoted as $\alpha_{rc}$; and if the satellite C satisfies $$\theta_{AC} \in \left[\theta_{AB} - \frac{\beta}{2}, \theta_{AB} + \frac{\beta}{2}\right), \alpha_{AC} > \max(\alpha_{AB}, \alpha_{rc}),$$

the satellite C is viewed as a visible satellite, or else, the satellite C is invisible.

8. The ARAIM availability prediction method according to claim 1, wherein a selection method of monitored fault modes for an ARAIM considering a terrain influence is as follows:

calculating the terrain shielding angles corresponding to all-directional angles with terrain model data, predicting to obtain a visible satellite set, calculating fault probabilities in different fault modes according to a primary service fault probability of a single satellite and primary service fault probabilities of at least two satellites in an integrity support message (ISM), and selecting a larger fault mode therefrom as the monitored fault mode in a principle that a total probability of fault modes to be monitored should not exceed a preset value.

9. The ARAIM availability prediction method according to claim 1, wherein an ARAIM continuity risk method considering a terrain influence is as follows:

calculating the terrain shielding angles corresponding to all-directional angles with terrain model data, predicting to obtain a visible satellite set, and equally distributing a continuity risk budget to each selected monitored fault mode.

10. The ARAIM availability prediction method according to claim 1, wherein a protection level prediction method considering a terrain influence is as follows:

calculating the terrain shielding angles corresponding to all-directional angles with a terrain model data, predicting to obtain a visible satellite set, and performing a calculation with a visible satellite performance parameter to obtain the protection level.

* * * * *